US007113656B2

(12) United States Patent
Jiang

(10) Patent No.: US 7,113,656 B2
(45) Date of Patent: Sep. 26, 2006

(54) LABELING SYSTEM AND METHODOLOGY

(76) Inventor: Hubin Jiang, 10359 Carol St., Great Falls, VA (US) 22066

( * ) Notice: Subject to any disclaimer, the term of this patent is extended or adjusted under 35 U.S.C. 154(b) by 629 days.

(21) Appl. No.: 10/647,026

(22) Filed: Aug. 22, 2003

(65) Prior Publication Data

US 2005/0040642 A1 Feb. 24, 2005

(51) Int. Cl.
*G06K 9/54* (2006.01)
*G06K 9/34* (2006.01)

(52) U.S. Cl. ....................................... 382/306; 382/180

(58) Field of Classification Search ................ 382/173, 382/180, 254, 266, 298, 306, 309, 318, 321; 358/1.4, 3.15, 505

See application file for complete search history.

(56) References Cited

U.S. PATENT DOCUMENTS 5,195,123 A * 3/1993 Clement ..................... 378/166
5,848,202 A 12/1998 D'Eri et al.
5,903,646 A 5/1999 Rackman
6,192,165 B1 * 2/2001 Irons .......................... 382/306
6,418,279 B1 7/2002 Weinberger et al.
6,793,755 B1 * 9/2004 Schaupp et al. ............ 156/215
6,848,205 B1 * 2/2005 Rieger et al. ................. 40/310
6,942,912 B1 * 9/2005 Blom et al. ................ 428/41.1

* cited by examiner

*Primary Examiner*—Kanjibhai Patel
(74) *Attorney, Agent, or Firm*—Roberts, Mlotkowski & Hobbes

(57) ABSTRACT

A digitization process and system which involves the use of a novel label, labeling system and labeling methodology. According to the teachings of the present invention, the label is comprised of two parts one of which is transparent and the other of which is opaque. Bates numbers or other identifiers according to some sequential numbering or ordering scheme are placed on the opaque portion of the label. The labels are placed on document edges prior to scanning and removed after scanning. Following scanning, an interactive quality control process is carried out in order to ensure image integrity against the original document sequence and integrity. After the sequence and integrity of the images is verified, the images are cropped so as to remove the ordering information and then the document may be stored possibly for later retrieval via its unique identifier. In this way, document integrity can be assured and stored document images reflect the actual document appearance rather than as modified by a label or stamped identifier. Labels may easily be removed from the original hard copy documents so that these documents may also be returned to their original form.

14 Claims, 4 Drawing Sheets

LABELING SYSTEM AND METHODOLOGY

BACKGROUND

1. Field of the Invention

The present invention relates generally to document imaging and processing and more particularly to systems and methods for marking, digitizing and sequencing documents and storing and accessing the same.

2. Background of the Invention

Even with the widespread use of computers in business and in daily life, the use of paper-based documents to record, communicate and store information remains exceedingly popular. Although software applications offer new and improved functions such as character recognition, managed document archival and retrieval and specialized image processing, many businesses can not leverage these capabilities because they maintain a significant amount of information in paper form rather than electronically.

Various other drawbacks are associated with business processes that involve storing large amounts of information in paper form as opposed to maintaining such information electronically. For example, pages can easily be lost or misplaced, large physical spaces may be required for storing the documents, and information may not be readily accessed through search applications which are available for electronically stored information.

In some contexts, even though information was originally created and stored using paper documents, conversion to electronic format via digitization is required for one or more reasons. For example, in the case of litigation, it is often necessary to store, access, produce and analyze a large number of documents associated with the particular dispute.

In almost all cases, and particularly with respect to litigation, it is desirable to access documents, once they have been digitized, in an efficient and consistent manner such that particular documents can be called up via an access system and according to specific criteria.

In the context of litigation, "Bates Numbers" are typically used to identify and sequence documents that are to be scanned. These numbers may comprise any sequential ordering but typically they employ a combined numeric and alphabetic sequencing code which is pre-assigned prior to scanning. In most cases the sequential identifiers are either stamped on the documents themselves via a stamper or labels with the identifiers are created and placed on the documents.

In either of the above cases, the documents themselves are essentially modified prior to scanning by virtue of the stamp or the label which is applied. In some applications this is at best undesirable and at worst unacceptable. Both labels and stamps can obscure textual or graphic information on the documents. In addition, documents can be damaged by the stamping process and/or labeling affixation.

Difficulties in maintaining document integrity and the original ordering also arise during the digitization process. With typical digitization business processes, documents can be lost or caused to be out of order during the time they reside at the scanning location and/or during the scanning process itself.

Yet another problem associated with typical document imaging business processes arises out of the fact that both human and machine error may manifest themselves during the process of scanning of physical documents. As a result, physical documents to be scanned can be lost, never scanned, scanned out of order and/or improperly scanned. Because of this problem it is generally not possible to validate the integrity of the scanned documents, their contents or their ordering. The inability to validate sets of imaged documents to a particular level of probability can, in turn, lead to situations in which the imaging process may not be applicable for a particular need.

For example, in the context of litigation, if document imaging was not originally done according to a process with a sufficient level of integrity verification, then difficulties may arise in connection with how a court treats the available evidentiary universe. Similarly, verification of document integrity can be a concern when documents are specifically imaged after the fact for the purposes of litigation. Imaging processes may also be unusable or suspect in other cases such as in the context of imaging, storing and cataloguing vital records such as birth certificates, passports, financial statements as well as various other governmental and commercial vital records.

SUMMARY OF THE INVENTION

It is therefore a primary object of the present invention to provide a system and methodology which improves upon prior art systems and methodologies and their related drawbacks as described above.

It is an object of the present invention to provide a system and methodology which permits sequencing, inventorying and cataloging of scanned documents without causing damage to the documents themselves.

It is another object of the present invention to provide a system and methodology which permits sequencing, inventorying and cataloging of scanned documents without obscuring any information on the documents as a result of the digitization process.

It is yet another object of the present invention to provide a system and methodology which offers a high level of assurance of document integrity.

It is a still further object of the present invention to provide a system and methodology which ensure that all inventoried documents are imaged.

These and other objects of the present invention are obtained through the use of a novel label, labeling system and labeling methodology. According to the teachings of the present invention, the label is comprised of two parts one of which is transparent and the other of which is, in one embodiment, opaque. Bates numbers or other identifiers according to some sequential numbering or ordering scheme are placed on the opaque portion of the label. The labels are placed on document edges prior to scanning and removed after scanning. Following scanning, an interactive quality control process (possibly with optical character recognition (OCR) technology) is carried out in order to ensure image integrity against the original document sequence and integrity. After the sequence and integrity of the images is verified, the images are cropped so as to remove the ordering information and then the document images may be stored possibly for later retrieval via their unique identifiers. In this way, document integrity can be assured and stored document images reflect the actual document appearance rather than as modified by a label or stamped identifier. Labels may easily be removed from the original hard copy documents so that these documents may also be returned to their original form.

These and other advantages and features of the present invention are described herein with specificity so as to make the present invention understandable to one of ordinary skill in the art.

DETAILED DESCRIPTION OF THE INVENTION

The present invention for document imaging and management is now described. The present invention comprises a system for document imaging and labeling as well as a process therefor. In the description that follows, numerous specific details are set forth for the purposes of explanation. It will, however, be understood by one of skill in the art that the invention is not limited thereto and that the invention can be practiced without such specific details and/or substitutes therefor. The present invention is limited only by the appended claims and may include various other embodiments which are not particularly described herein but which remain within the scope and spirit of the present invention.

Figure 1:
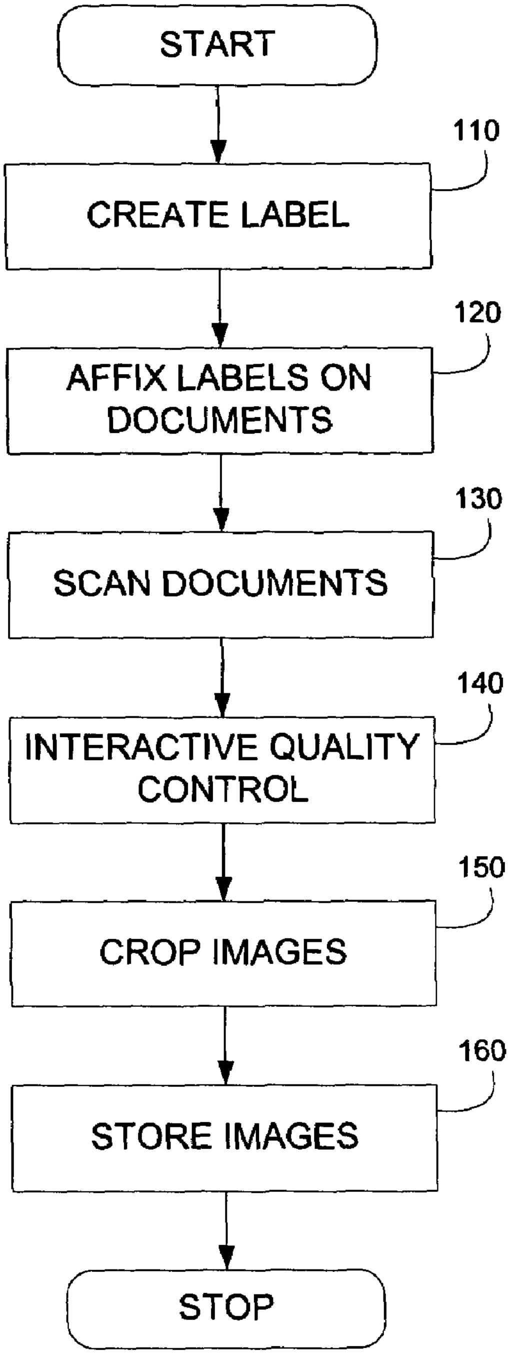
FIG. 1 is a flow diagram illustrating the primary steps in connection with the present invention according to a preferred embodiment thereof.
Figure 2:
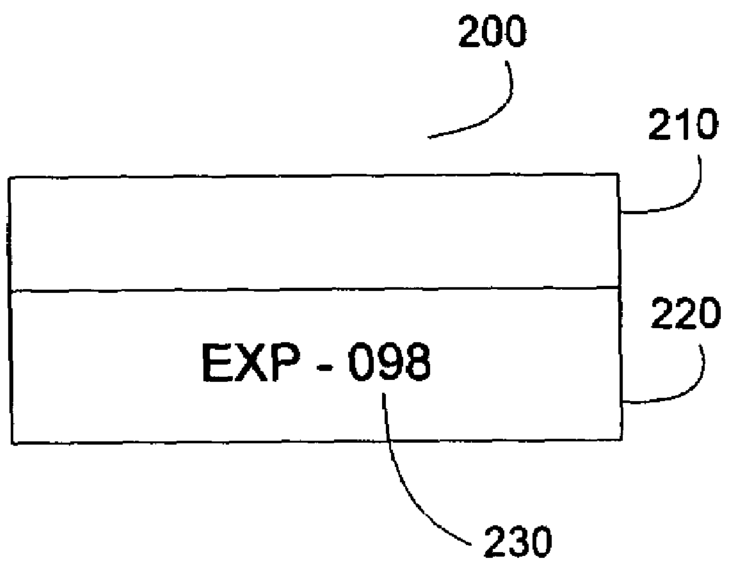
FIG. 2 is an illustration of the novel label of the present invention in a preferred embodiment thereof.

FIG. 1 is a flowchart illustrating the labeling and scanning process of the present invention according to a preferred embodiment thereof. As shown in FIG. 1, the first step is the creation of a label 110. A preferred embodiment of the label which is used in connection with the present invention is shown in FIG. 2. The label 200 consists of two parts. An upper part 210 is transparent and contains a low strength removable adhesive on the front side. A lower part 220 is opaque and is imprinted with a sequential number 230 such as a bates number. Alternatively, lower part 220 may be transparent so long as a sequential number may be printed and viewed thereon. As will be understood by one of skill in the art, any sequential ordering system may be used whether through the use of numbers, letters, symbols or some combination thereof. The low strength removable adhesive is located on the front side of part 210 or the back side. Further, the label may be of any shape and size desired. While shown in FIG. 2 as a rectangular, label 200 can be formed in other shapes such as, for example, a square or other polygon or even a circular or oval shape. The relative sizes of lower part 220 versus upper part 210 of label may also be varied as desired.

Figure 3:
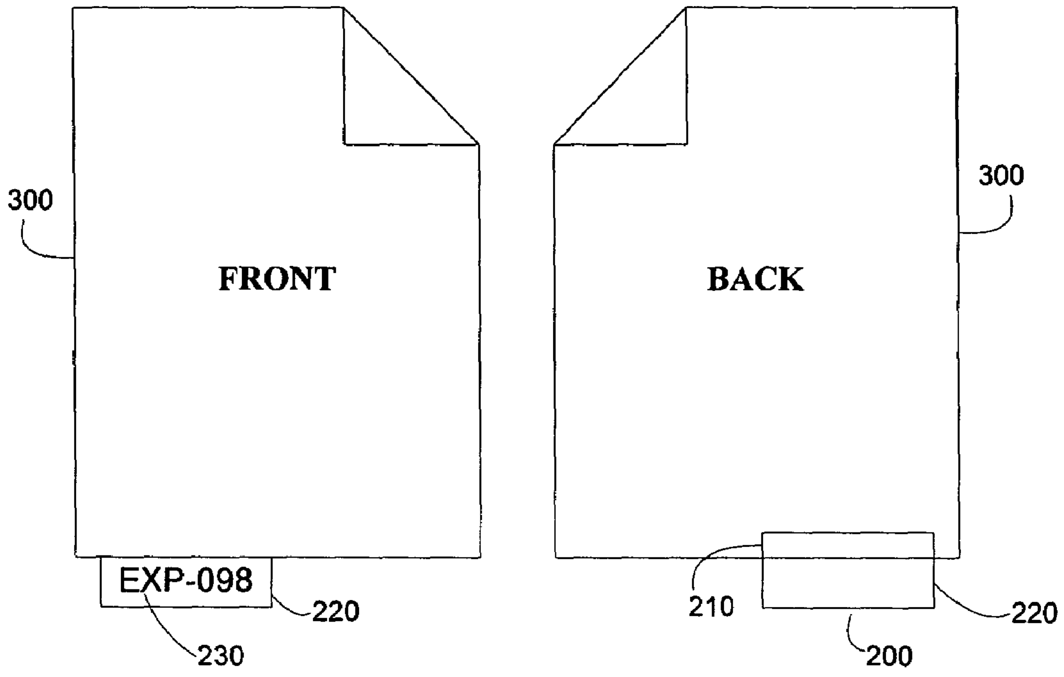
FIG. 3 is an illustration showing the positioning of a label on a document sheet according to the present invention in a preferred embodiment thereof.

Returning to the process, next, at step 120, labels 200 are affixed to each of the documents to be scanned. In a preferred embodiment as shown in FIG. 3, one label 200 is affixed to each document page 300. Upper part 210 of label 200 is affixed to the back of document page 300 using the adhesive on upper part 210 of label 200. In this embodiment, the adhesive is applied to the same side of label 200 which contains sequential number 230. In this way, when viewing document 300 from the front thereof, sequential number 230 on bottom part 220 of label 200 may be viewed. As an alternative (not shown), adhesive may be applied to the side of upper part 210 of label 200 opposite that containing sequential number 230 and label 200 may then be applied to the front of document page 300. Although sequential number 230 will also be viewable from the front of document page 300 in this case, this alternative requires affixation to the front of document page 300. Although FIG. 3 shows placement of label 200 at the bottom of document page 300, this invention is not necessarily limited thereto. Label 200 may be placed at any edge of document page 300 and at any position thereon.

While the above discussion assumes that document pages 300 are single-sided and are blank on the back, it is also possible that some or all document pages are double-sided. For each double-sided document, a label 200 is applied to each side of the document. As will be apparent to one of skill in the art, each such document is then scanned twice, once to read the front side of the document and another time to read the backside.

The next step in the process, step 130, calls for scanning document pages 300 so as to digitize them and make them available to system processing applications including the ability to store images as well as to quality control the scanning process as discussed below. So long as labels 200 are properly applied to document pages 300 in the right sequential order, once all labels 200 have been applied, document pages 300 may be separated for scanning at separate scanning stations either to decrease the time to scan by scanning in parallel or because different formats of document pages 300 exist requiring separate scanners for different media types or document sizes. Separation of document pages 300 may also be done for both of the above purposes or for other purposes.

Once document pages 300 have been scanned, in the next step 140, an interactive quality control may be undertaken in order to assure that all document pages 300 got scanned and that no document page 300 was scanned more than once. As is known in the art, sometimes scanner feed mechanisms or human operator error can cause pages to be missed or scanned more than one time. The interactive quality control step 140 according to the teachings of the present invention is designed to eliminate these document integrity problems before the overall digitization process is completed so that users that later access the collective document pages 300 can feel secure that all document pages 300 were scanned in and exist in the database. Interactive quality control step 140 may include an image collection process, which merges images scanned separately into one batch to facilitate the quality control of image integrity, sequence, and quality. Such image collection process can alternatively be conducted as a separate process from interactive quality control step 140.

According to this step, interactive QC calls for the use of Optical Character Recognition (OCR) in order to recognize the labels 200 and the sequential numbers 230 contained thereon. If a duplicate sequential number 230 is identified, typically it means that a document page was inadvertently scanned twice and one copy can be deleted. Alternatively, if a gap in sequence numbers is identified, it typically means that a document page 300 that should have been scanned was not. In this case, the missing document page 300 can be located and scanned. OCR techniques can also be employed during this step to make sure that scans were completed without errors (e.g. no blank page scans or garbled text or images). If such an error is identified, the digital scan can be compared against the original document page 300 to determine if the scan was faulty and if so, the applicable document pages 300 can be rescanned. It is not mandatory to use OCR technology. Any Man or man-Machine interactive system may be employed.

Figure 4:
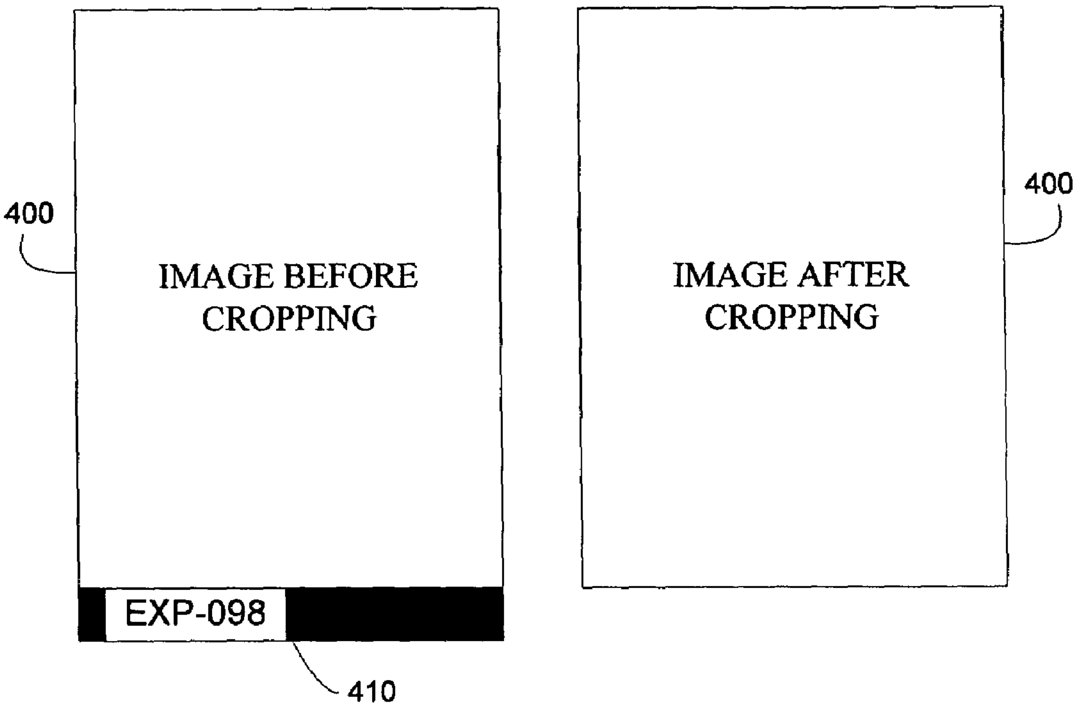
FIG. 4 is an illustration of the cropping step for removing the label data from an image according to a preferred embodiment of the present invention.

The next step, step 150 calls for removal of the label portion of the scanned image for each document page 300 via cropping. Depending upon the selected size of bottom part 220 of label 200, cropping may be accomplished by a software application as is known in the art configured to crop an amount of image that coincides with the size of bottom part 220 of label 200 or to crop by using automatic edge detection. For example, if bottom part 220 of label 200 is ¾" in height (i.e. the amount label 200 extends below the original document page 300) then the cropping operation would cut approximately ¾" from the bottom of the scanned image. Of course, if label 200 is applied to the top edge or side edges of document pages 300 then the applicable edge would be cropped rather than the bottom edge as shown. If automatic edge detection is used, the size of label part 220 becomes irrelevant. FIG. 4 shows the image before cropping where image 400 includes label part image 410. After cropping, image 400 recovers to its original image. Label image 410 may have a background color other than black depending on the imaging system parameter settings. The crop images step 150 can be omitted if bates number or other numbering is required or acceptable for a specific application.

Once the cropping step has been completed, at step 160, the cropped images can be stored in a project or file database for later access. The stored images, when processed according to the above process will contain an imaged version of the original document exactly as it appears without a stamped bates or other number as is typically the case with prior art systems and methodologies. Additionally, according to the present invention, the database storing the images may also contain information tags which are associated with each document page 300. These tags may specify the sequential number of the document (as originally contained on the label), document size and format information, scanning date and/or other information which is applicable to each document page 300 and/or the project or scanning operation.

Although not shown as a step in the process illustrated by FIG. 1, in most cases labels 200 may be removed from the original documents at any time after the scanning step 130 has been completed. Preferably, however, label removal is delayed further until the interactive QC step 140 has been completed such that errors can be addressed while labels are still affixed to each of the document pages 300.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A methodology for imaging documents, said methodology comprising the steps of:

(a) placing a label on an edge of at least one document, said label comprising a first part and a second part, said second part of said label comprising an ordered identifier and wherein said first part is located on the surface of said at least one document and said second part extends beyond said edge of said at least one document;

(b) scanning said at least one document and said label to create an image, said image comprising a scan of both said document and said label; and (c) cropping said image to remove the portion of said image containing said second part of said label.

2. The methodology of claim 1 wherein said first part of said label is transparent and said second part of said label is opaque.

3. The methodology of claim 1 wherein said first part of said label is transparent and said second part of said label is transparent.

4. The methodology of claim 1 wherein said ordered identifier is a number.

5. The methodology of claim 4 wherein said number is a bates number.

6. The methodology of claim 1 further comprising a quality control step following said scanning step.

7. The methodology of claim 6 wherein said quality control step comprises verifying the integrity of said image with respect to said at least one document.

8. The methodology of claim 6 wherein a plurality of documents are scanned and said quality control step comprises verifying the sequence of the resulting images with respect to said plurality of documents.

9. The methodology of claim 8 wherein said quality control step further comprises verifying the integrity of said resulting images with respect to said plurality of documents.

10. The methodology of claim 7 wherein said verification employs optical character recognition.

11. The methodology of claim 1 wherein said label is affixed to the bottom edge of said at least one document.

12. The methodology of claim 1 wherein said label is affixed to the top edge of said at least one document.

13. The methodology of claim 1 wherein said label is affixed to said edge of said document using a removable adhesive.

14. The methodology of claim 1 wherein said label is rectangular.

* * * * *